April 28, 1964    H. F. SCHELLACK    3,130,757
METHOD OF FABRICATING GRID ELECTRODES
Filed Aug. 12, 1960
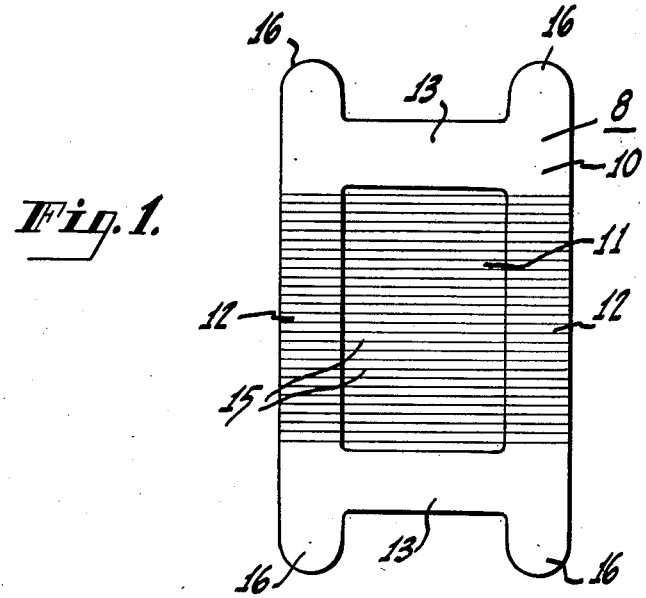
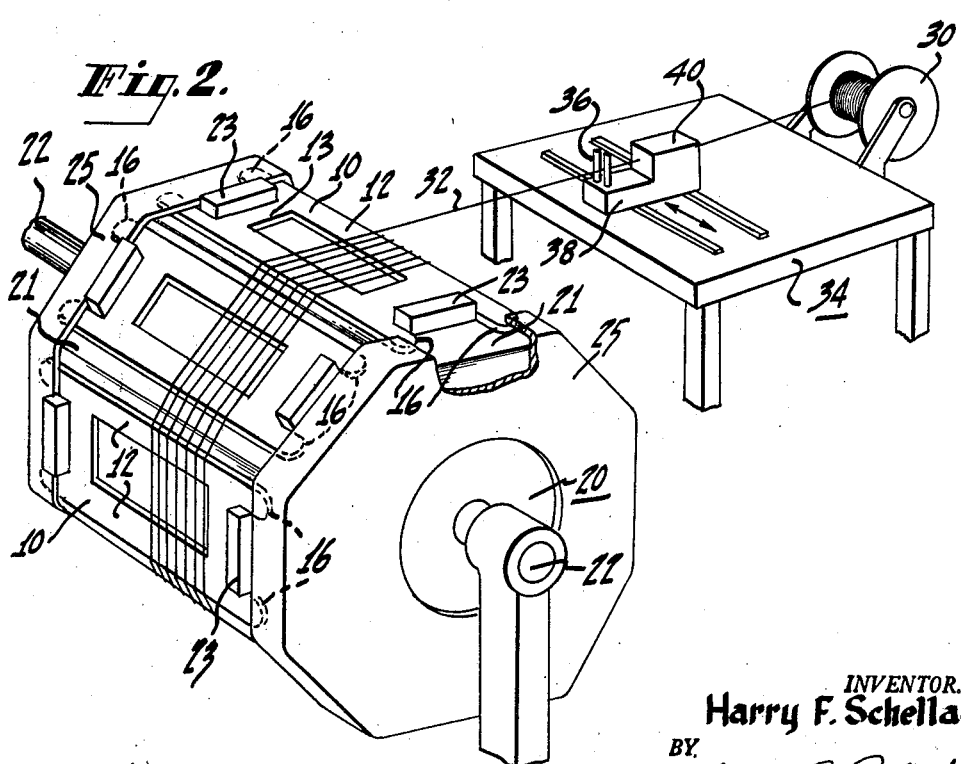
INVENTOR.
Harry F. Schellack
BY
William A. Zalesak
Attorney 3,130,757
METHOD OF FABRICATING GRID ELECTRODES
Harry Franz Schellack, Belleville, N.J., assignor to Radio Corporation of America, a corporation of Delaware
Filed Aug. 12, 1960, Ser. No. 49,344
9 Claims. (Cl. 140—71.5)

This invention relates to electron discharge tubes and more particularly to a method of fabricating grid electrodes for such tubes.

It is well known that an ideal or theoretically perfect grid electrode for an electron discharge tube would be a "Maxwell" grid, that is, a grid having an infinite number of equally spaced lateral wires of infinitesimal diameter. Use of such a grid would result in an electron tube of optimum electrical performance, having such desired characteristics as high transconductance and perfectly linear and hence distortionless output. Although a true "Maxwell" grid has not yet been made, approximations thereto may be achieved by fabricating grids having a great many closely and uniformly spaced lateral wires of very small diameter. Modern practice is such, indeed, that in the attempt to closely approximate such "Maxwell" grids, the diameter of the grid lateral wires in the grids of certain types of tubes have been reduced to the point where the wires are not self-supporting when wound unsupported about side members, but must be wound on support frames.

One type of frame in common use is a planar frame which is stamped from sheet metal. The frames are formed with an aperture therein, and lateral wires are laid across the aperture and joined to the frame support members by brazing. Although other methods for securing laterals to the frames are known, brazing has been used extensively in the art and it is to this process that the present invention is directed.

In the manufacture of frame grid electrodes by brazing, an efficient and economical method widely used is to wind a number of turns of a tensioned, continuous lateral wire simultaneously about a plurality of frames spaced around a mandrel. If the mandrel has a larger thermal coefficient of expansion than the lateral wire, the differential expansion between the mandrel and the lateral wire during the brazing process will stretch the wound wire. As long as the wire is not stretched beyond its elastic limit, the wire will tend to contract to its original tension upon cooling. However, if the wire is stretched beyond its elastic limit, it will not contract to its initial tension, and at temperatures lower than those encountered during the brazing operation, the lateral wire is under reduced tension and may even become loose and slack. Such reduced tension permits excessive vibration of the lateral wire turns, resulting in the production of microphonic noise in the output of electron tubes using such grids, as is generally understood. Moreover, in order to maintain the lateral wire turns in proper spaced relation about the frames and mandrel before and during brazing, the wire is wound under the highest possible tension. Thus, it is not feasible to reduce the initial tension under which the wire is wound for the purpose of providing a greater margin of permitted elastic stretching of the lateral wire.

One possible solution to this differential expansion problem is to allow the lateral wire turns to become slack during the brazing operation, then to retension the lateral turns in a subsequent fabricating step by deforming the frames to increase the distance between the lateral wire supports. A disadvantage of this method is that each grid must be processed individually in the extra fabricating step which increases the cost of the grids. Because of the fragile nature of such grid electrodes, moreover, it has been found very difficult to deform the wound frames to tension all the laterals uniformly while not also destroying a large percentage of the grids in the process.

Another solution is to restrict the application of heat to only those portions of the frames where the lateral wires are joined to the frames. The remaining portions of the frames and mandrel are not heated, thereby avoiding thermal growth of these portions and hence harmful stretching of the lateral wires.

A disadvantage to this method, however, is that complicated apparatus having carefully adjusted and aligned parts must be provided for heating only the desired portions of each individual grid electrode. Because of the smallness of the grids, and the complexity of the apparatus, the slightest changes in the grid frame dimensions to produce grids for different electron tube types requires extensive down time and modification of the apparatus for adapting it to process the new grid structures.

Accordingly, it is an object of this invention to provide an improved method for high speed and efficient production of grid electrodes.

More particularly, it is an object of this invention to prevent excessive stretching of the lateral wires of grid electrodes during the fabrication of said electrodes.

A further object of this invention is to provide an improved method of fabrication of grid electrodes wherein a minimum of fabrication processes need be employed and wherein a plurality of grid electrodes may be fabricated simultaneously.

For achieving these and other objects of this invention, there is provided a solid, drum-like mandrel of a type known in the art, the circumference of which is adapted to receive a plurality of planar frames in spaced apart relation thereabout. An end of a lateral wire is fixed to one of the frames, and the wire is wound in a plurality of turns about the mandrel and the frames under a predetermined tension by any known suitable winding means. After the winding is completed, the other end of the wire is also fixed to one of the frames.

In accordance with this invention, the mandrel and the wound frames thereon are heated in such a manner that the lateral wire and the frames are heated to a temperature sufficient to braze the wire turns to the frames, while the interior portions of the mandrel remain relatively cool.

As will be described in greater detail hereinafter, the effect of maintaining the interior of the mandrel at a relatively low temperature is to restrict the thermal expansion of the mandrel, and to produce a more similar rate of thermal growth between the lateral wire and the mandrel, whereby excessive stretching of the lateral wire wound about the mandrel is avoided.

After the brazing process, the grids are removed from the mandrel and the lateral wires extending between the frames are severed to complete the grid electrodes.

Having thus briefly described the invention, a preferred embodiment thereof will be more clearly set forth in connection with the accompanying drawing wherein:

FIG. 1 shows a plan view of a grid structure, the wires of which have been brazed by the method herein described and, FIG. 2 is a view in perspective, partially broken away for clarity, of apparatus for winding a grid lateral wire over mandrel supported planar grid frames.

As shown in FIG. 1, a grid electrode 8 of the type which may be fabricated according to this invention comprises a flat metal frame 10 having a rectangular aperture 11 bounded by a pair of parallel side members 12 and a pair of cross straps 13. A plurality of parallel, uniformly spaced lateral wires 15 are stretched across aperture 11 and are brazed to the side members 12. Also provided at each end of frame 10 are two mounting tabs 16, the tabs having utility in the assembly of the completed grid electrode within an electron tube.

Since the present invention does not relate to electron tube structures, per se, and since electron tubes which employ grid electrodes of the type shown are known in the art, this disclosure will proceed with reference only to the grid electrodes, and to the improved method for fabricating such electrodes.

For brazing the grid lateral wire turns 15 to frame 10, as will be described hereinafter, the frame 10 is clad with some suitable brazing material, such as copper. For preventing the lateral wires 15 from becoming unbrazed during operation of the electron tube wherein the grid electrode is mounted, the brazing material must have a higher melting point than the temperatures the grid electrode will encounter within the electron tube. Copper has a melting point of 1080° C., which is sufficiently high for this purpose.

As shown in FIG. 2, apparatus for reducing the improved method to practice includes a polygonal work mandrel 20, which is solid except for an axial hole therethrough for mounting the mandrel for rotation. Mandrel 20 has a plurality of flat faces 21 spaced uniformly about the periphery thereof, each face being adapted to receive a frame 10. Two raised stops 23 of a size to fit snugly between the mounting tabs 16 of the frames 10 are provided in each face 21, whereby the frames may be accurately positioned on the mandrel with the frame side members 12 parallel to the mandrel longitudinal axis. For permitting expansion of the frames during the brazing operation, the frames are maintained in spaced apart relation, as shown. Two retaining covers 25 are also provided which fit tightly around the mandrel 20 and the frames 10 mounted thereon for preventing displacement of the frames during the lateral wire winding operation.

For winding a continuous wire about the mandrel 20 and the frames 10, mandrel 20 is rotatably mounted on spindle 22, which is coupled to a suitable rotating means, not shown. Feed spool 30 is rotatably mounted in a position to permit feed of a wire 32 through a wire guide device 34 to the mandrel 20. The wire guide device 34 is represented only generally, since such devices are well known in the art, and includes a pair of wire guide posts 36 mounted on the slide 38, and the wire tensioning device represented by block 40.

In this embodiment, the grid frames 10 are formed from molybdenum, the grid lateral wires 15 from tungsten, and the mandrel 20 also preferably from molybdenum. Molybdenum, it is observed, has a thermal coefficient of expansion of $5.5 \times 10^{-6}$ per degree centigrade as compared to $4.44 \times 10^{-6}$ per degree centigrade of tungsten, and upon heating, molybdenum will expand at a greater rate than tungsten.

The choice of these materials is based upon many important factors. For example, because of the difficulty of providing wire made from any material other than tungsten in sizes down to .0004 of an inch in diameter, tungsten is invariably used for the grid lateral wire in grids employing very fine wires. The differential expansion problem, it is noted, could be avoided if it were possible to fabricate the mandrel from tungsten also. However, tungsten is very difficult to machine, is not presently economically available in bulk form, and is not sufficiently heat resistance to withstand the repeated exposures to high temperatures required by my process. Hence, use of tungsten for mandrels as herein described is prohibitively expensive.

Molybdenum is an excellent material for both the frames 10 and the mandrel 20 because of its commercial availability and the relative ease with which it may be machined, because of its high strength and high thermal conductivity, and because of its high resistance to heat distortion. The strength and conductivity properties of molybdenum are especially advantageous in the fabrication of the grid frames because of the necessity of making the fragile grids as rigid as possible, and because of the necessity of conducting heat from the grid electrodes for permitting operation of the grids within electron tubes at the lowest possible temperatures, for reasons well known.

The last property of molybdenum mentioned is important for economical reasons. Because of the large expense of preparing the machined mandrel 20, it is essential that the mandrel may be used over and over again. The high heat resistivity, or refractory characteristic of molybdenum, permits repeated exposure of the mandrel to the brazing process, the mandrel being neither corroded, pitted nor distorted by the high temperature cycling thereof.

It is observed that since copper will not readily wet molybdenum, it is necessary to first flash coat the frames 10 with a material which adheres well to molybdenum and which is wettable by copper, such as nickel and to plate the copper thereon. Moreover, to prevent any brazing of the frames to the mandrel, the mandrel is clad with a material which is relatively non-wettable by copper, such as chrome oxide.

At the start of the winding operation, an end of wire 32 is fixed, as by cementing, at one end of a frame 10 mounted on mandrel 20, and the wire 32 is then wound, as indicated in FIG. 2 about the mandrel and the frames. The wire is wound under a predetermined tension, and in a contitnuous helix over the extent of the frames between the cross straps 13 adjacent each end thereof. As shown, the lateral wire does not engage the mandrel faces 21, but engages only the surfaces of the frames to insure intimate contact therewith for positive brazing. At the conclusion of the winding operation, the other end of wire 32 is also secured to a frame 10.

For brazing the lateral wire turns 15 to the frames 10, in accordance with this invention, the wound mandrel 20 is heated in such a manner that the frames and the lateral wire turns on the periphery thereof reach a temperature sufficient to melt the brazing material for fusing the frames and the lateral turns together, while maintaining the interior of the mandrel 20 relatively cool.

Although many methods may be employed for heating the mandrel in the manner described, a very simple and practical method is to remove the wound mandrel 20 from the winding spindle 22, remove the retaining covers 25 from the mandrel, and to insert the mandrel into a heated brazing furnace (not shown) for a predetermined period of time. Since the mandrel is heated from the outside in, it is possible to select a period of time which is sufficient to allow the outside of the mandrel and the wound frames thereon to reach the brazing temperature, but which is not long enough to permit uniform heating of the entire mandrel volume.

Another method would be to provide high frequency electrical induction means for heating the outside of the mandrel only. Because of the rapidity of surface heating by such means, the frames and wire turns can be heated, brazed, and cooled with practically no heat flow into the mandrel interior.

Although the outside of the mandrel is heated to the brazing temperature, the effect of the temperature gradient within the mandrel is to restrict the peripheral expansion of the mandrel to a value less than what it would be if the entire mandrel were heated to the same temperature. Since the lateral wire turns will also expand due to the heat, it is not necessary to avoid all expansion of the mandrel, but merely to limit the expansion thereof to an amount which approximates the expansion of the lateral wire turns.

The principle by which the mandrel expansion is limited may be readily explained by way of hypothetical example. Thus, if the mandrel were composed of two closely fitting concentric cylinders of the same material, and if the outer cylinder only were heated, the two cylinders would separate as to the outer cylinder expanded away from the inner. If the two cylinders were mechanically locked together, however, the inner cylinder would prevent expansion of the outer cylinder, and stresses would be set up therebetween. For a single piece solid mandrel, it is thus intuitively apparent that the effect of nonuniform heating of the mandrel will result in some complex balance between the formation of internal stresses within the mandrel, and restricted thermal expansion of the hotter portions thereof.

The actual temperature gradients necessary to achieve the desired mandrel expansion according to this invention, and the time required to produce them, are dependent upon the masses of the mandrel, frames, and lateral wire, upon the materials employed, upon the winding tension, and upon the heating capacity of the brazing furnace. Although no simple formula may be given to properly relate these variables, they may be readily determined by simple trial and error experimentation.

In the practice of this invention, it is very important that the lateral wire 32 be wound under a closely controlled, predetermined amount of tension. As mentioned, for example, it is necessary that some initial tension be employed to maintain the proper spacing of the lateral wire turns on the frames prior to and during brazing. Moreover, if the grid frames and grid laterals are formed from dissimilar materials having different coefficients of thermal expansion, the different rates of expansion of the laterals and frames will affect the lateral wire tension in the completed grid electrodes. The reason for this is that upon initial heating, the individual lateral wire turns are not secured to the frames until the brazing temperature is first reached and then reduced, the frames and the lateral wire turns being free to slide past each other. Upon initial cooling, the brazing material quickly hardens to secure the portions of the wire turns which are in contact with the frame side members 12 to the frames. Upon further cooling, the dissimilar rates of contraction of the frames 10 and the wire turns 15 result either in an increased or decreased tension in the secured lateral turns.

Thus, if the frames contract at a greater rate than the lateral turns, as in this embodiment, the result upon cooling is that the tension of the lateral wires is reduced. To insure that the grid electrode has a sufficient lateral wire tension to avoid harmful vibrations thereof, it is necessary to wind the lateral wire under an initial tension greater than that desired in the final grid electrode.

Conversely, if the frames contract more slowly than the lateral turns, the effect upon cooling is that there will be a tendency to stretch the lateral wires and to deform the frames. Since the frames have greater strength than the fragile lateral wires, the result is that the tension of the lateral wires will be increased. To prevent breakage of the lateral turns it is necessary that the winding tension be less than that desired in the final grid.

Mandrel 20, it is observed, may be of any size which is convenient for winding and brazing. The mandrel shown in FIG. 2 is representative only, and has but eight sides for reasons of ease and clarity of drawing. In one commercial embodiment of this invention, for example, mandrel 20 has twenty-four sides, has a width of about .8 inch, and has a peripheral length of about 8 inches. The frames 10, which may be wound thereon, are .010 inch thick, .325 inch wide, and .770 inch long, and are spaced about the mandrel with about .005 inch clearance therebetween. The grid wire 32 used is gold plated tungsten, .0004 inch in diameter, wound over the frames 10 at 189 wires to the inch. Gold is used on the wire because of its high work function and hence its ability to limit undesired electron emission from the grid lateral wires.

The wound mandrel is placed in a brazing furnace which is at a temperature of between 1090 and 1140 degrees centigrade, and which has a protective atmosphere of hydrogen therein for preventing oxidation of the mandrel or wound frames. The mandrel is removed from the furnace after five minutes, which time is sufficient for heating the grid frames and wire thereon to above 1090 degrees centigrade for brazing the wire to the frames, but which time is too short to allow full heating of the mandrel and full expansion thereof.

After cooling, the wires extending between the frames are cut by a knife edge to separate the grid electrodes.

What is claimed is:

1. A method of fabricating frame grid assemblies comprising fixing a plurality of frames on a mandrel, laying a wire having a coefficient of thermal expansion smaller than that of said mandrel around said mandrel and in engagement with said frames, heating said wire and said frame for brazing said wire to said frames, and heating and controlling the expansion of said mandrel for providing similar rates of thermal growth of said wire and said mandrel.

2. A method of fabricating frame grid assemblies comprising fixing a plurality of frames in spaced relation about the periphery of a mandrel, laying a wire having a coefficient of thermal expansion smaller than that of said mandrel down in successive turns around the periphery of said mandrel and in engagement with said frames, heating the entire periphery of said mandrel for brazing said wire to said frames, and cooling said mandrel after the heating and before the inside of said mandrel acquires a temperature near the temperature of the outside of said mandrel for providing similar rates of thermal growth of said wire and said mandrel.

3. A method of fabricating grid assemblies comprising maintaining a plurality of frames on a mandrel, securing the end of a wire having a smaller thermal coefficient of expansion than that of said mandrel to one of said frames, winding said wire around said mandrel and in contact with the exposed surfaces of said frames, applying heat to said mandrel for heating said frames and said wire to a temperature sufficient to braze said wire to said frames, and simultaneously maintaining internal portions of said mandrel at a temperature lower than said brazing temperature for providing a thermal expansion of said mandrel which is similar to the thermal expansion of said wire avoiding an excessive thermal growth differential between said wire and said mandrel.

4. A method of fabricating grid assemblies comprising maintaining a plurality of frames about the periphery of a mandrel, securing the end of a wire having a smaller thermal coefficient of expansion than that of said mandrel to one of said frames, winding said wire under a predetermined amount of tension around the periphery of said mandrel and in contact with the exposed surfaces of said frames, applying heat to the entire outside surface of said mandrel for heating said frames and said wire to a temperature sufficient to braze said wire to said frames, and removing the source of heat before internal portions of said mandrel reach said brazing temperature, whereby excessive thermal growth differentials between said wire and said mandrel are avoided.

5. A method of fabricating frame grid electrodes comprising fixing a plurality of molybdenum frames in spaced apart relation about the periphery of a molybdenum mandrel, securing an end of a tungsten wire to one of said frames, winding said wire under a predetermined tension in a helix around the periphery of said mandrel and in contact with said frames, and heating the outside of the wound mandrel for a predetermined period of time sufficient to heat only the outside of said mandrel to a temperature high enough for brazing said wire to said frames and for causing said mandrel to expand at a rate similar to the expansion of said wire, whereby excessive thermal growth differentials between said mandrel and said wire are avoided.

6. A method of fabricating frame grid electrodes comprising fixing a plurality of molybdenum frames having copper coated thereon in spaced apart relation about a molybdenum mandrel, securing an end of a tungsten wire to one of said frames, winding said wire under a predetermined tension in a helix around the periphery of said mandrel and in contact with said frames, heating the outside of the wound mandrel for a predetermined period of time sufficient to heat only the outside of said mandrel to a temperature high enough to melt the copper on said frames for brazing said wire to said frames, and cooling said mandrel before the inside of said mandrel reaches said temperature for preventing an excessive thermal growth differential between said mandrel and said wire.

7. A method of fabricating frame grid electrodes comprising fixing a plurality of frames in spaced apart relation about a polygonal mandrel, securing an end of a wire to one of said frames, winding said wire under a predetermined tension in a helix around the periphery of said mandrel and in contact with said frames, baking the wound mandrel in a furnace for a predetermined period of time for heating only the outside of said mandrel to a temperature sufficient to braze said wire to said frames, and cooling said mandrel before the inside of said mandrel reaches said temperature for controlling the amount of expansion of said mandrel for preventing excessive thermal growth differentials between said mandrel and said wire.

8. A method of fabricating frame grid electrodes comprising fixing a plurality of copper clad, nickel plated molybdenum frames in spaced apart relation about a molybdenum mandrel having a surface non-wettable by copper, securing an end of a tungsten wire to one of said frames, winding said wire under a predetermined tension in a helix around the periphery of said mandrel and in contact with said frames, baking the wound mandrel in a furnace having a protective atmosphere at a temperature above 1090° C. for a predetermined period of time for heating only the outside of said mandrel to a temperature sufficient to melt the copper on said frames, and cooling said mandrel before the inside of said mandrel reaches a temperature near the temperature of the outside of said mandrel for providing a thermal growth of said mandrel similar to the thermal growth of said wire for preventing an excesisve thermal growth differential between said mandrel and said wire.

9. A method of fabricating grid electrodes which utilizes a molybdenum mandrel having a surface which is non-wettable by copper, said mandrel having a peripheral length of eight inches and a width of .8 inch, and a brazing furnace, said brazing furnace having a protective atmosphere therein and being at a temperature between 1090 and 1140 degrees centigrade, said method comprising fixing a plurality of copper clad, nickel plated molybdenum frames in spaced apart relation about said mandrel, securing an end of a tungsten wire to one of said frames, winding said wire under a predetermined tension in a helix around the periphery of said mandrel and in contact with said frames, placing the wound mandrel in said brazing furnace for a period of five minutes for heating only the outside of said mandrel to a temperature above 1090 degrees whereby the copper on said frames is melted, and removing said mandrel from said brazing furnace before the inside of said mandrel reaches a temperature near 1090 degrees centigrade for preventing an excessive thermal growth differential between said mandrel and said wire.

References Cited in the file of this patent
UNITED STATES PATENTS

| | | |
|---|---|---|
| 2,810,186 | Pruszynski | Oct. 22, 1957 |
| 2,845,691 | Atherton | Aug. 5, 1958 |
| 2,871,150 | Fraser | Jan. 27, 1959 |
| 2,874,453 | Losco | Feb. 24, 1959 |
| 2,897,395 | Miller | July 28, 1959 |
| 2,909,200 | Miller | Oct. 20, 1959 |

FOREIGN PATENTS

| | | |
|---|---|---|
| 769,747 | Great Britain | Mar. 13, 1957 |